(12) United States Patent
Sauer et al.

(10) Patent No.: US 11,801,795 B2
(45) Date of Patent: Oct. 31, 2023

(54) VEHICULAR CAMERA WITH LENS HEATER WITH CONNECTORS

(71) Applicant: Magna Electronics Inc., Auburn Hills, MI (US)

(72) Inventors: Stefan Sauer, Waldaschaff (DE); Rene Dreiocker, Rochester Hills, MI (US); Steven V. Byrne, Goodrich, MI (US); Jonathan D. Conger, Berkley, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 93 days.

(21) Appl. No.: 17/447,829

(22) Filed: Sep. 16, 2021

(65) Prior Publication Data
US 2022/0089102 A1    Mar. 24, 2022

Related U.S. Application Data

(60) Provisional application No. 63/199,389, filed on Dec. 23, 2020, provisional application No. 63/199,040, (Continued)

(51) Int. Cl.
| | |
|---|---|
| B60R 11/04 | (2006.01) |
| H04N 5/225 | (2006.01) |
| G02B 7/02 | (2021.01) |
| G03B 17/55 | (2021.01) |
| H01R 12/71 | (2011.01) |

(Continued)

(52) U.S. Cl.
CPC ............ *B60R 11/04* (2013.01); *G02B 7/028* (2013.01); *G03B 17/55* (2013.01); *H01R 12/716* (2013.01); *H04N 23/51* (2023.01); *H04N 23/55* (2023.01); *H04N 23/57* (2023.01); *B60R 2300/105* (2013.01); *H01R 2201/26* (2013.01)

(58) Field of Classification Search
CPC ..... B60R 11/04; B60R 2300/105; B60S 1/56; G02B 7/028; G03B 17/08; G03B 17/55; G03B 29/00; H01R 12/716; H01R 12/728; H01R 13/2442; H01R 2201/26; H04N 23/51; H04N 23/52; H04N 23/54; H04N 23/55; H04N 23/57
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |

(Continued)

*Primary Examiner* — William C Vaughn, Jr.
*Assistant Examiner* — Naod W Belai
(74) *Attorney, Agent, or Firm* — HONIGMAN LLP (57) ABSTRACT

A vehicular camera includes a camera housing, a lens assembly having a lens, an imager printed circuit board (imager PCB), and a heating device. The imager PCB is disposed at the camera housing and the lens is aligned with an imager disposed at the imager PCB. The heating device is disposed at at least a portion of the lens assembly and includes an electrically connecting portion having electrical contacts at an end thereof, with the electrical contacts disposed at an inner surface of the camera housing. The heating device is electrically connected to circuitry of the vehicular camera via electrical connectors that electrically connect with the electrical contacts of the electrically connecting portion of the heating device at the camera housing as the vehicular camera is assembled.

27 Claims, 6 Drawing Sheets

Related U.S. Application Data filed on Dec. 3, 2020, provisional application No. 62/706,920, filed on Sep. 18, 2020.

(51) Int. Cl.
*H04N 23/51* (2023.01)
*H04N 23/55* (2023.01)
*H04N 23/57* (2023.01)

(56) References Cited

U.S. PATENT DOCUMENTS

| | | |
|---|---|---|
| 5,760,962 A | 6/1998 | Schofield et al. |
| 5,786,772 A | 7/1998 | Schofield et al. |
| 5,796,094 A | 8/1998 | Schofield et al. |
| 5,877,897 A | 3/1999 | Schofield et al. |
| 5,929,786 A | 7/1999 | Schofield et al. |
| 5,949,331 A | 9/1999 | Schofield et al. |
| 6,201,642 B1 | 3/2001 | Bos |
| 6,222,447 B1 | 4/2001 | Schofield et al. |
| 6,302,545 B1 | 10/2001 | Schofield et al. |
| 6,396,397 B1 | 5/2002 | Bos et al. |
| 6,498,620 B2 | 12/2002 | Schofield et al. |
| 6,523,964 B2 | 2/2003 | Schofield et al. |
| 6,611,202 B2 | 8/2003 | Schofield et al. |
| 6,636,258 B2 | 10/2003 | Strumolo |
| 6,690,268 B2 | 2/2004 | Schofield et al. |
| 6,717,610 B1 | 4/2004 | Bos et al. |
| 6,757,109 B2 | 6/2004 | Bos |
| 6,802,617 B2 | 10/2004 | Schofield et al. |
| 6,806,452 B2 | 10/2004 | Bos et al. |
| 6,822,563 B2 | 11/2004 | Bos et al. |
| 6,882,287 B2 | 4/2005 | Schofield |
| 6,891,563 B2 | 5/2005 | Schofield et al. |
| 6,946,978 B2 | 9/2005 | Schofield |
| 7,005,974 B2 | 2/2006 | McMahon et al. |
| 7,038,577 B2 | 5/2006 | Pawlicki et al. |
| 7,145,519 B2 | 12/2006 | Takahashi et al. |
| 7,161,616 B1 | 1/2007 | Okamoto et al. |
| 7,230,640 B2 | 6/2007 | Regensburger et al. |
| 7,248,283 B2 | 7/2007 | Takagi et al. |
| 7,295,229 B2 | 11/2007 | Kumata et al. |
| 7,301,466 B2 | 11/2007 | Asai |
| 7,592,928 B2 | 9/2009 | Chinomi et al. |
| 7,720,580 B2 | 5/2010 | Higgins-Luthman |
| 7,855,755 B2 | 12/2010 | Weller et al. |
| 7,859,565 B2 | 12/2010 | Schofield et al. |
| 7,881,496 B2 | 2/2011 | Camilleri et al. |
| 7,965,336 B2 | 6/2011 | Bingle et al. |
| 8,542,451 B2 | 9/2013 | Lu et al. |
| 8,694,224 B2 | 4/2014 | Chundrlik, Jr. et al. |
| 8,994,878 B2 | 3/2015 | Byrne et al. |
| 9,036,026 B2 | 5/2015 | Dellantoni et al. |
| 9,077,098 B2 | 7/2015 | Latunski |
| 9,277,104 B2 | 3/2016 | Sesti et al. |
| 9,565,342 B2 | 2/2017 | Sauer et al. |
| 9,621,769 B2 | 4/2017 | Mai et al. |
| 9,878,669 B2 | 1/2018 | Kendall |
| 10,071,687 B2 | 9/2018 | Ihlenburg et al. |
| 10,142,532 B2 | 11/2018 | Mleczko |
| 10,230,875 B2 | 3/2019 | Mleczko et al. |
| 10,250,004 B2 | 4/2019 | Conger et al. |
| 10,272,857 B2 | 4/2019 | Conger et al. |
| 10,466,563 B2 | 11/2019 | Kendall et al. |
| 10,484,587 B2 | 11/2019 | Conger |
| 10,761,319 B2 | 9/2020 | Kumar |
| 10,894,275 B2 | 1/2021 | Byrne et al. |
| 11,140,301 B2 | 10/2021 | Condron et al. |
| 11,535,158 B2 | 12/2022 | Liu et al. |
| 2009/0244361 A1 | 10/2009 | Gebauer et al. |
| 2010/0097519 A1 | 4/2010 | Byrne et al. |
| 2010/0208077 A1 | 8/2010 | DeWard et al. |
| 2011/0249120 A1* | 10/2011 | Bingle .............. H04N 23/52 348/148 |
| 2012/0062743 A1 | 3/2012 | Lynam et al. |
| 2013/0242099 A1* | 9/2013 | Sauer .............. B60R 1/12 348/148 |
| 2014/0218535 A1 | 8/2014 | Ihlenburg et al. |
| 2014/0373345 A1 | 12/2014 | Steigerwald |
| 2015/0124098 A1 | 5/2015 | Winden et al. |
| 2015/0222795 A1 | 8/2015 | Sauer et al. |
| 2015/0327398 A1 | 11/2015 | Achenbach et al. |
| 2016/0037028 A1 | 2/2016 | Biemer |
| 2016/0243987 A1 | 8/2016 | Kendall |
| 2016/0264064 A1 | 9/2016 | Byrne et al. |
| 2016/0268716 A1 | 9/2016 | Conger et al. |
| 2016/0272163 A1 | 9/2016 | Dreiocker et al. |
| 2016/0286103 A1 | 9/2016 | Van Dan Elzen |
| 2017/0129419 A1 | 5/2017 | Conger et al. |
| 2017/0133811 A1 | 5/2017 | Conger et al. |
| 2017/0201661 A1 | 7/2017 | Conger |
| 2017/0280034 A1 | 9/2017 | Hess et al. |
| 2017/0295306 A1 | 10/2017 | Mleczko |
| 2018/0098033 A1 | 4/2018 | Mleczko et al. |
| 2018/0152609 A1 | 5/2018 | Wang et al. |
| 2018/0170279 A1 | 6/2018 | Achenbach et al. |
| 2018/0207691 A1 | 7/2018 | Byrne et al. |
| 2018/0338070 A1 | 11/2018 | Sigle |
| 2018/0338071 A1 | 11/2018 | Becker et al. |
| 2019/0113743 A1 | 4/2019 | Kumar |
| 2020/0292918 A1* | 9/2020 | Park ................ H04N 23/55 |
| 2020/0314311 A1 | 10/2020 | Liu et al. |
| 2020/0379206 A1* | 12/2020 | Rafalowski .......... G02B 7/028 |
| 2022/0053112 A1 | 2/2022 | Lu |
| 2022/0089102 A1 | 3/2022 | Sauer et al. |

* cited by examiner

VEHICULAR CAMERA WITH LENS HEATER WITH CONNECTORS

CROSS REFERENCE TO RELATED APPLICATIONS

The present application claims the filing benefits of U.S. provisional application Ser. No. 63/199,389, filed Dec. 23, 2020, U.S. provisional application Ser. No. 63/199,040, filed Dec. 3, 2020, and U.S. provisional application Ser. No. 62/706,920, filed Sep. 18, 2020, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

Obscuring view by condensation or ice, as well as mud, salt or dust is becoming an increasing issue for vehicle cameras as their ability to determine and recognize objects can be limited or interrupted. Vehicle manufacturers have recently started to add a lens heating function within some cameras to defog the elements when needed. This function is typically very expensive and it is difficult to assemble the heating element inside of the camera and to seal the camera with the additional wires for powering the heating elements at the lens or lens barrel.

SUMMARY OF THE INVENTION

A vision system or imaging system for a vehicle utilizes one or more cameras (preferably one or more CMOS cameras) to capture image data representative of images exterior of the vehicle, and provides a heating element to heat the lens of the camera. The camera may be mounted or disposed at an exterior structure of the vehicle, such as, for example, a vehicle panel, grill, bumper, fascia, light bar, center high mounted stop lamp (CHMSL) or the like, with its lens viewing exterior of the vehicle. The heating element is disposed at or at least partially circumscribes the lens barrel and operates to heat the portion or portions of the lens assembly or lens barrel or lens support structure and thus to heat the lens optics or lens elements of the lens. The heating element is electrically connected to circuitry at a printed circuit board of the camera via electrical connectors, such as spring-loaded electrically conductive pins or terminals. The spring-loaded or biased electrical connection avoids wires extending to the heating element and limits or avoids or reduces contact and/or forces applied to the imager printed circuit board so that the presence of the electrical connectors for the heating element do not adversely affect focus and alignment of the lens and imager.

These and other objects, advantages, purposes and features of the present invention will become apparent upon review of the following specification in conjunction with the drawings.

DESCRIPTION OF THE PREFERRED EMBODIMENTS

A vehicular vision system and/or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
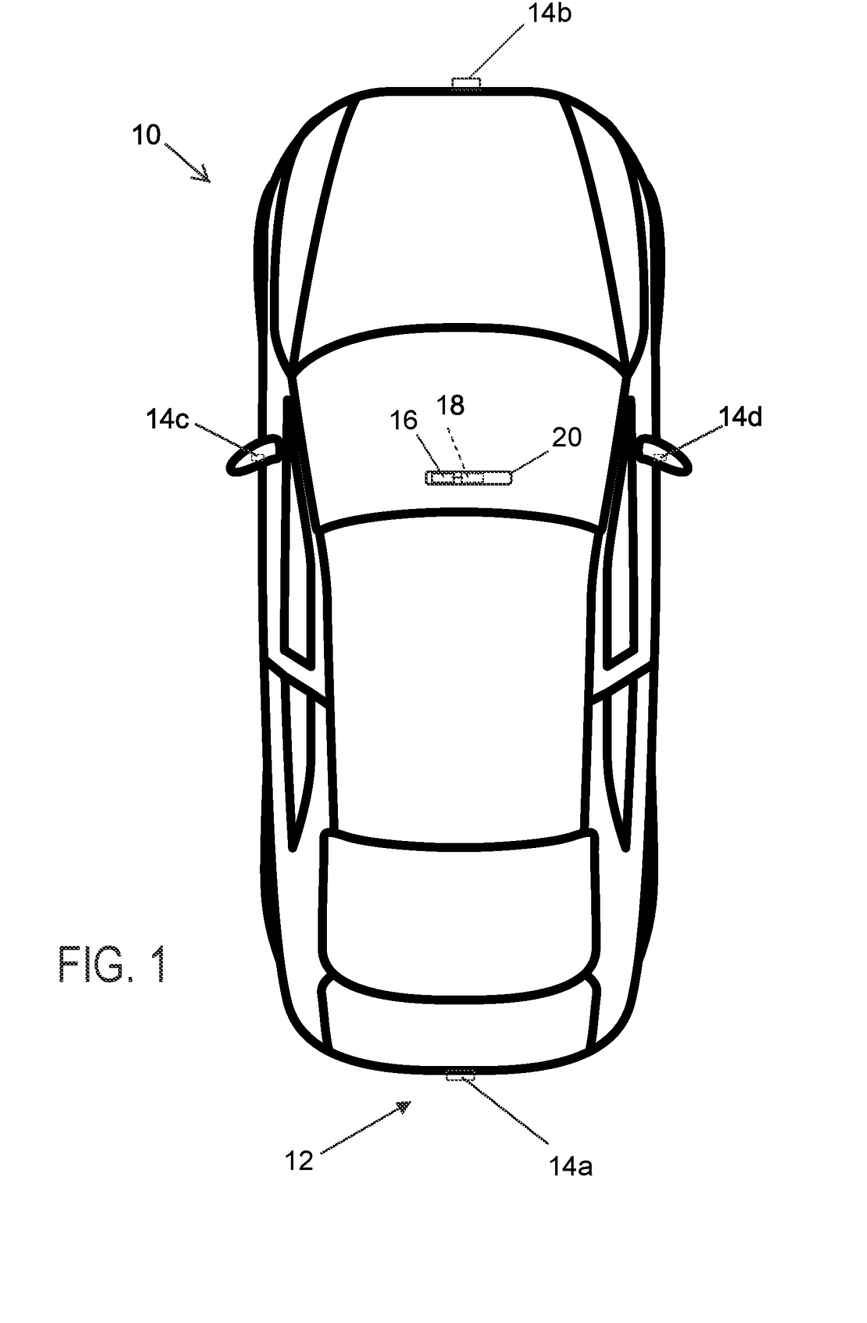
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forward facing camera 14b at the front (or at the windshield) of the vehicle, and a sideward/rearward facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) 18 having electronic circuitry and associated software, with the electronic circuitry including an image processor that is operable to process image data captured by the cameras. The system may process captured image data for object detection or identification, and/or may provide displayed images at a display device 16 for viewing by the driver of the vehicle (although shown in FIG. 1 as being part of or incorporated in or at an interior rearview mirror assembly 20 of the vehicle, the ECU 18 and/or the display device 16 may be disposed elsewhere at or in the vehicle). The data transfer or signal communication from the camera to the ECU may comprise any suitable data or communication link, such as a vehicle network bus or the like of the equipped vehicle.

The cameras each include a housing and an imager and a lens that is oriented such that the camera views exterior of the vehicle. Because the camera is disposed at the vehicle exterior, such cameras are exposed to cold temperatures and temperature and humidity fluctuations, whereby moisture and/or ice or snow may form or collect at the lens. Such automotive camera lenses are also susceptible to dirt or debris collecting at the lens of the camera. This is particularly an issue for cameras mounted at the front of a vehicle, such as at a front bumper or grill or fascia of the vehicle, or at the rear of the vehicle.

Figure 2:
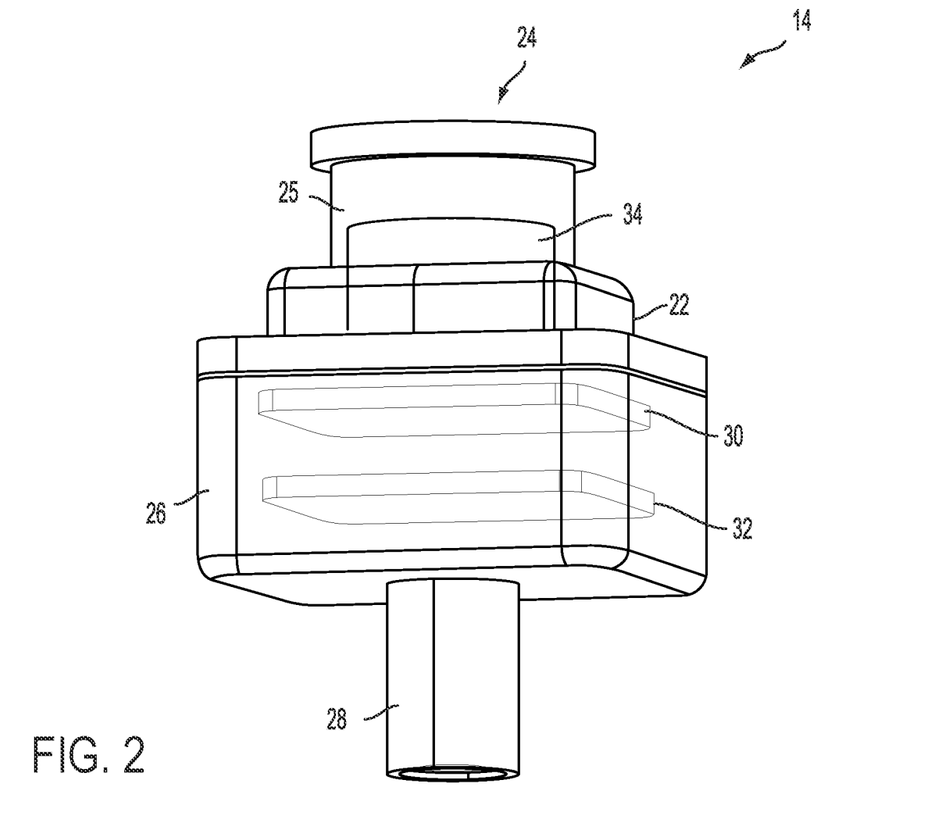
FIG. 2 is a perspective view of a camera having printed circuit boards and a heater element.

As shown in FIG. 2, the camera 14 includes a lens holder or front housing portion 22, which supports or accommodate a lens assembly 24, which includes a lens barrel 25 (such as a cylindrical lens barrel) that houses or accommodates a lens having a plurality of lens optics or lens elements. The lens barrel 25 may comprise a metal lens barrel (or may comprise any other suitable material, such as a plastic or polymeric or thermoplastic material or the like). The camera 14 includes a rear housing portion 26 that is mated with the lens holder or front housing portion 22 to encase an imager printed circuit board (imager PCB) 30 (having the imager disposed thereat and aligned with the lens) and a connector printed circuit board (connector PCB) 32 therein. The rear housing portion 26 includes a connector portion 28 (such as a coaxial connector) for electrically connecting the camera 14 to a wire harness or coaxial connector of the vehicle. The camera 14 includes a heating device 34 disposed at the lens barrel 25 and at least partially circumscribing the lens barrel.

The heating device 34 disposed at the lens barrel 25 may comprise any suitable heating device oriented within, integrated with, or at least partially circumscribing the lens barrel 25. For example, the heating device 34 may be disposed at an inner portion of the lens barrel 25, such that the heating device 34 circumscribes an inner circumference or inner surface of the lens barrel 25 or is disposed at a lens accommodated by the lens barrel 25, or the heating device 34 may be disposed within a wall or integrated into the lens barrel 25, or the heating device 34 may be disposed exterior or at an outer surface of the lens barrel 25. Typically, heating devices have two wires coming from the bottom of the lens barrel for electrical connection to a power source of the camera, which is generally an electrical connection at a PCB of the camera. These wires become difficult to position and control during the focus and alignment of the camera. Connecting these wires to a PCB of the camera is a manual operation that is prone to error or damage.

Figure 3:
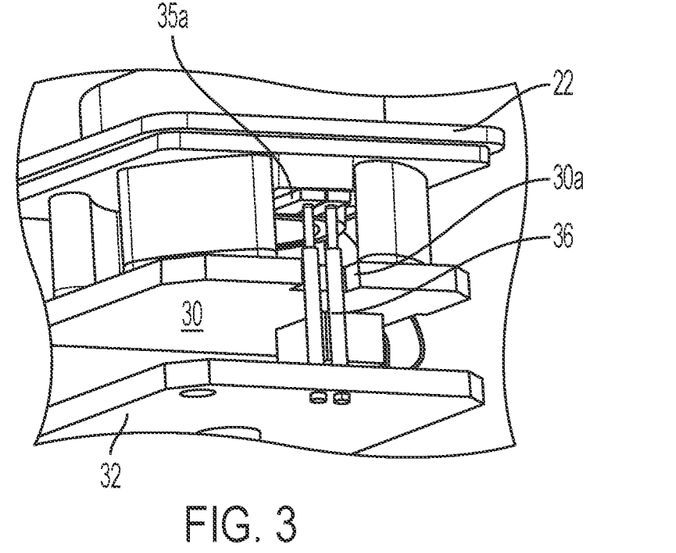
FIG. 3 is a perspective view of a portion of the camera, showing the imager PCB, the connector PCB, and the lens barrel with the heating device electrically connected to the connector PCB via spring-loaded electrical connectors that pass through a notch in the imager PCB.
Figure 4:
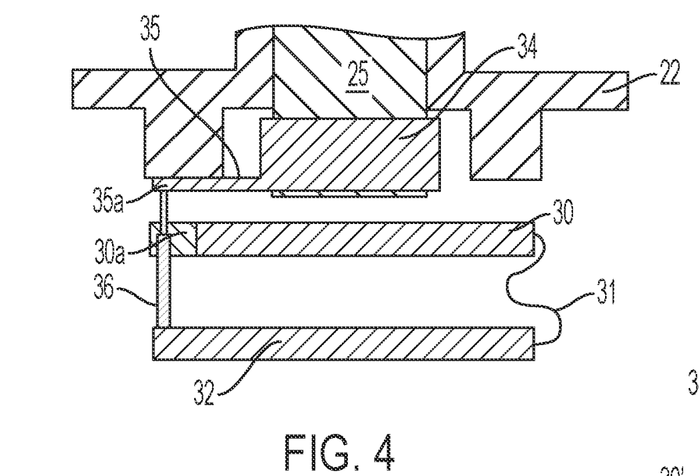
FIG. 4 is a sectional view of the portion of the camera of FIG. 3.

As shown in FIGS. 3 and 4, the heating device 34 is disposed at and at least partially around the lens barrel 25 and includes an electrical connection portion 35 that extends radially outward from the lens barrel to provide a pair of electrically connecting terminals or contacts 35a. The imager PCB 30 is disposed between the connector PCB 32 and the lens barrel 34, with an imager of the imager PCB 30 optically aligned with the lens of the lens barrel 34. The connector PCB 32 includes a pair of spring-loaded electrical connectors or terminals or pins 36 that are electrically connected to circuitry at the connector PCB 32 and that extend toward the imager PCB 30 for electrical connection to the terminals or contacts 35a of the electrical connection portion 35 of the heating device 34.

For example, the spring-loaded connectors may comprise telescopic pins having an inner electrically conductive pin and an outer electrically conductive pin, with the inner pin slidably received in the outer pin and biased outward toward an extended state by a spring or biasing element (which may also be electrically conductive) disposed within the outer pin. In the illustrated embodiment, the outer pin is secured (such as via soldering or the like) at the connector PCB 32 (and electrically connected to circuitry or an electrically conductive trace at the connector PCB). Other extendable and retractable (and biased toward the extended state) pins or elements may be utilized to electrically connect to the heating device contacts.

The electrical connection between the connector PCB 32 and the heating device 34 can be made automatically during camera assembly with spring contacts that can accommodate the varying lens position during and due to focus and alignment, but, if the connectors 36 engage or urge against the imager PCB 30, the spring fingers or connectors 36 may apply a force on the imager PCB 30, which can change the focus or make the glue cure more difficult. In other words, the heating device 34 is electrically connected via pins 36 that contact the connector PCB 32 instead of the imager PCB 30 and avoids force imparted by the spring connectors 36 on the PCB which could alter or impede focus and/or alignment of the lens with the imager of the imager PCB 30. Thus, the pins 36 may electrically connect to the connector PCB 32 without contacting the imager PCB 30.

Figure 5:
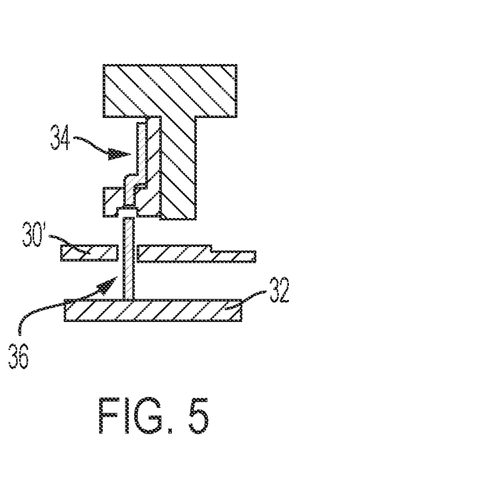
FIG. 5 is a sectional view of a portion of another camera, showing the imager PCB, the connector PCB, and the lens barrel with the heating device electrically connected to the connector PCB via spring-loaded electrical connectors that pass through the imager PCB.

In the illustrated embodiment, the electrical connectors or pins 36 extend from the connector PCB 32 and pass through a notch 30a formed at a periphery of the imager PCB 30, such that no contact is made between the imager PCB 30 and the spring-loaded connectors 36. The contact pads 35a of the heating device connector portion 35 are disposed at an underside or inner surface of the lens holder 22, and may be adhered or otherwise affixed relative to the lens holder 25. As can be seen with reference to FIGS. 3 and 4, the contacts 35a are disposed at the lens holder 25 at an area where the lens holder 25 does not attach to or engage the imager PCB 30 (with other portions of the lens holder 25 attaching to the imager PCB 30 via an adhesive or fastener or the like). The pins or connectors 36 may be press-fit or soldered to the connector PCB 32, which receives the power supply so the heating device 34 can be electrically powered without passing the current through the board-to-board ribbon cable 31 and through circuitry of the imager PCB 30. Optionally, and such as shown in FIG. 5, the pins 36 may pass through a hole or holes formed through the imager PCB 30' instead of through a peripheral notch, depending on the location of the contacts or pads 35a of the heating device 34 and/or the position of the electrical connection of the connector pins 36 on the connector PCB 32.

Thus, the ends of the heater wires or connectors 35 can be terminated at flat contact pads 35a, which may be attached or adhered to the bottom side of the lens holder 25 with a pressure sensitive adhesive or other fastening means. The elongated spring-loaded or pogo pins 36 are disposed at the connector PCB 32 with an opening in the imager PCB 30 to allow them to pass through and contact the heater electrical pads without contacting the imager PCB. This prevents any forces from the springs from bending the imager PCB and affecting the focus of the lens relative to the imager.

Optionally, springs or spring-loaded or biased connectors can be strategically placed on the imager PCB at a stiffened or more robust portion or area of the imager PCB to reduce PCB bending and thus to reduce the effect on the focus of the lens relative to the imager. The force from these springs would typically be around 1 Newton maximum, with enough swipe length to accommodate the varying position of the imager PCB relative to the lens holder and lens barrel. Likewise the pad may be sized to accommodate the lateral PCB shift of the imager PCB due to active alignment of the lens relative to the imager and imager PCB.

Figure 6:
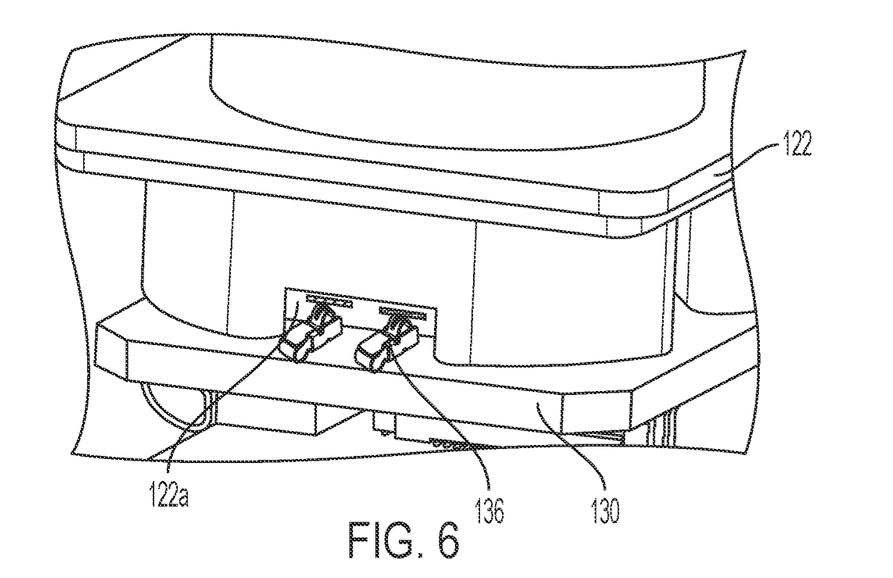
FIG. 6 is a perspective view of a portion of another camera, showing the imager PCB with spring-loaded electrical connectors that electrically connect to terminals of the heating device.
Figure 7:
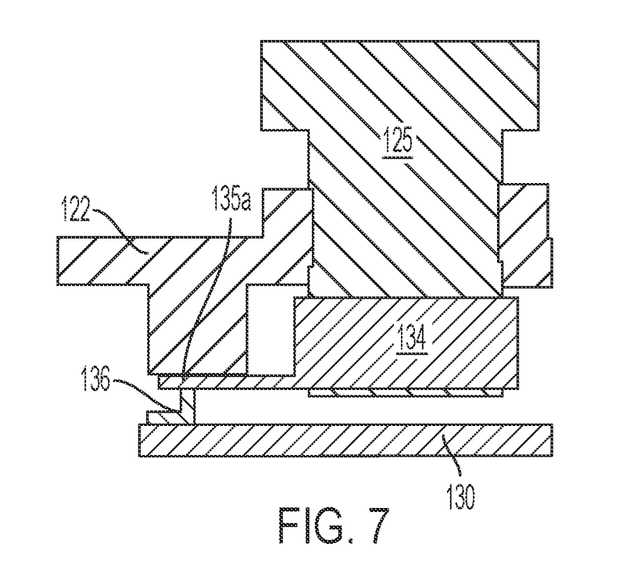
FIG. 7 is a sectional view of the portion of the camera of FIG. 6.
Figure 8:
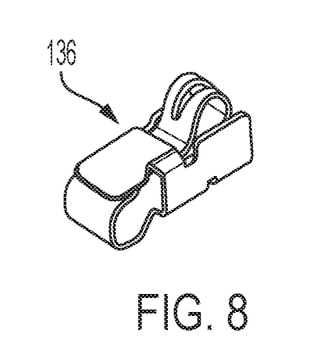
FIG. 8 is a perspective view of the electrical connector of FIG. 6.

For example, and such as shown in FIGS. 6-8, spring connectors 136 may be disposed at the imager PCB 130 at an outboard or perimeter region of the imager PCB 130 where the imager PCB 130 engages the lens holder 122 (such as where the imager PCB 130 may be attached at the lens holder 122). The heating device 134 is disposed at and at least partially around the lens barrel 125, and the contacts 135a of the heating device 134 are disposed at the lens holder 122, such as at a notched region 122a of the underside of the lens holder. The connectors 136 may comprise grounding springs or the like, and may be soldered to circuitry at the imager PCB 130. As shown in FIGS. 6 and 7, the connectors 136 are strategically placed at an area or region of the imager PCB 130 near the mounting locations of the imager PCB 130 to the lens holder 122 so the PCB stiffness is high and bending of the imager PCB 130 is minimized so as to limit or reduce any effect on the focus of the imager from the force from the connectors 136 and imager PCB 130.

Optionally, electrical connection to the heating device may be made via an electrically conductive pad attached at the lens holder. For example, and with reference to FIGS. 9 and 10, a camera 214 includes a lens holder or front housing portion 222, with electrically conductive pad or elements 238 disposed at or inserted in respective recesses 222a of the lens holder 222. The electrically conductive pads 238 are configured to electrically connect to a respective electrically conductive spring-loaded pin or connector 236 that is electrically conductively connected at a connector printed circuit board (connector PCB) 232.

Figure 9:
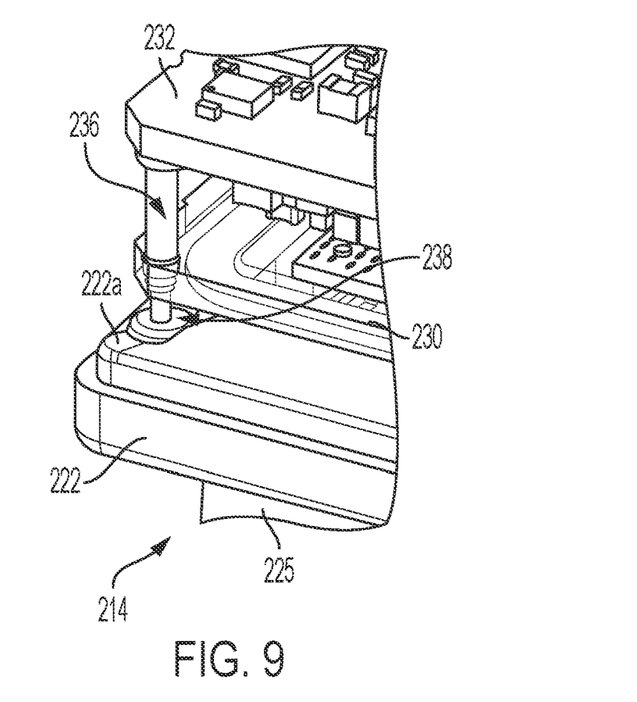
FIG. 9 is a perspective view of a portion of another camera, showing the imager PCB, the connector PCB, and the lens holder with the heating device electrically connected to the connector PCB via spring-loaded electrical connectors that pass through the imager PCB.
Figure 10:
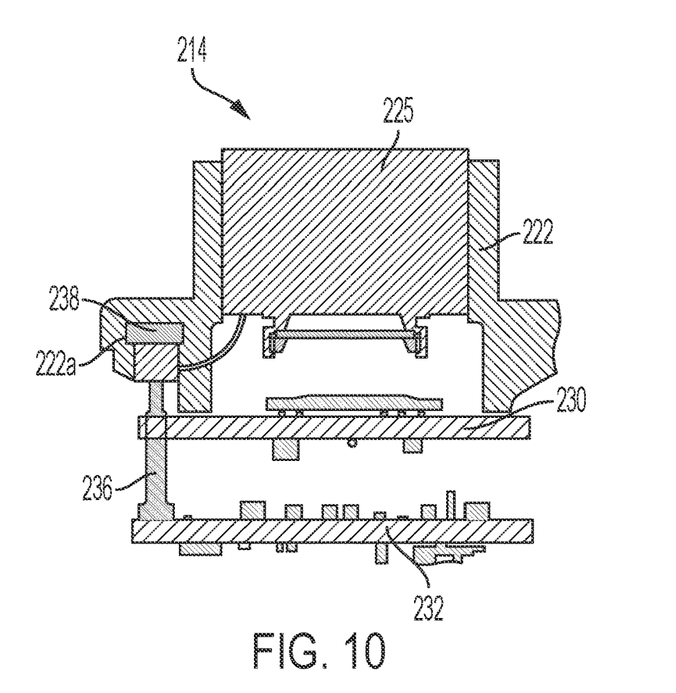
FIG. 10 is a sectional view of the portion of the camera of FIG. 9.

The lens holder 222 supports or accommodate a lens assembly 224, which includes a lens barrel 225 (such as a cylindrical lens barrel) that houses or accommodates a lens having a plurality of lens optics or lens elements. The lens holder 222 and/or lens barrel 225 may comprise metal (or may comprise any other suitable material, such as a plastic or polymeric or thermoplastic material or the like). The camera includes a rear housing portion that is mated with the lens holder or front housing portion 222 to encase an imager printed circuit board (imager PCB) 230 (having the imager disposed thereat and aligned with the lens) and the connector PCB 232 therein. The rear housing portion includes a connector portion (such as a coaxial connector) for electrically connecting the camera 214 to a wire harness or coaxial connector of the vehicle. The camera 214 includes a lens heater or heating device disposed at the lens barrel 225 and at least partially circumscribing the lens barrel 225, such as described above.

The electrically conductive pads 238 may be attached at the lens holder 222 at the recesses at a rear or bottom surface by a pressure activated adhesive tape or other suitable adhesive or attaching means. The electrically conductive pads 238 are electrically isolated from one another and from the housing or lens holder 222, such as via an air gap, a coating or an O-ring spacer or the like. The lens heater is connected to the electrically conductive pads 238 by wires or electrically conductive terminals that are routed inside the lens holder 222 between the lens heater and the electrically conductive pads 238. In the illustrated embodiment, the spring-loaded pins or connectors 236 engage electrically conductive pads or contacts at a side of the connector PCB 232 and pass through respective apertures of the imager PCB 230 (such as at two corners of the imager PCB) to engage the respective electrically conductive pads 238 at the lens holder 222.

Figure 11:
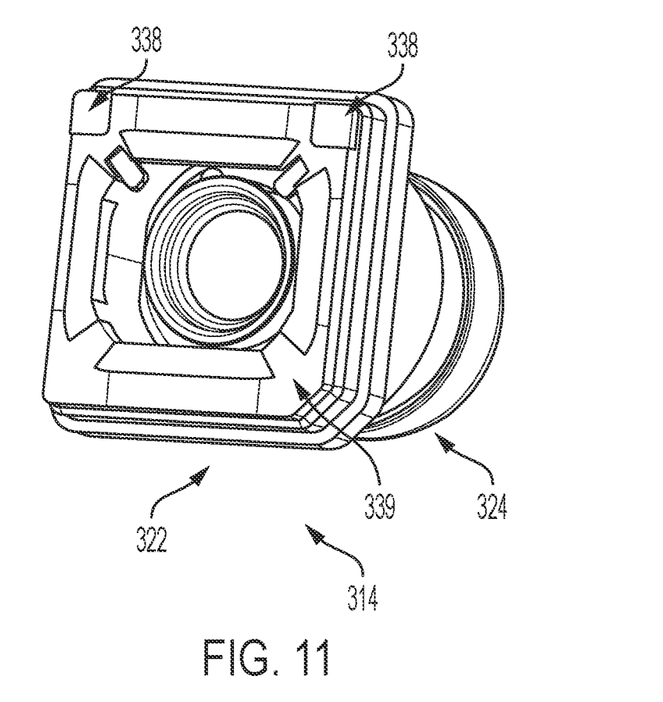
FIG. 11 is a perspective view of another camera, showing the lens holder with contact plates electrically connected to heater wires.
Figure 12:
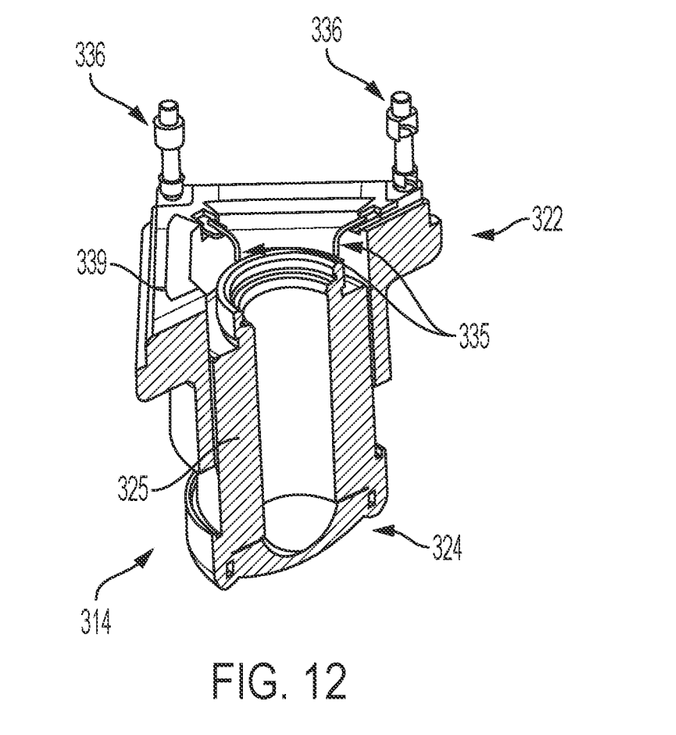
FIG. 12 is a sectional view of the camera of FIG. 11, showing the spring-loaded electrical connectors electrically connecting at the contact plates.

Optionally, and with reference to FIGS. 11 and 12, a camera 314 includes a lens holder or front housing portion 322, with electrically conductive pads or plates or elements 338 disposed at or inserted in or insert molded at a plastic carrier or retainer 339, which is configured for attachment at the lens holder 322. The contact plates 338 (which comprise metal plates) are soldered to the lens heater wires 335 and make contact to the spring-loaded electrically conductive connectors or pins 336 (which may be attached at or protrude through a connector PCB at the rear housing portion of the camera, and which may protrude through or pass along a side or corner edge of an imager PCB). The carrier 339 (which comprises a rigid plastic or flexible EPDM or the like), with the plates 338 disposed thereat, is mounted to the lens holder surface. For example, the carrier may be snap attached or adhesively attached to the inner surface of the lens holder 322. The carrier 339 is also used to close off any openings in the lens holder 322 that are used for mounting the carrier 339 to the lens holder 322 (such as, for example, at the four corners). The carrier 339 can also be reduced to two smaller pieces that are placed only on the corners to make contact with the pogo pins. The electrically conductive pads 338 are configured to electrically connect to respective ones of the electrically conductive spring-loaded pin or connectors 336 that are electrically conductively connected at the connector PCB.

The lens holder 322 supports or accommodate a lens assembly 324, which includes a lens barrel 325 (such as a cylindrical lens barrel) that houses or accommodates a lens having a plurality of lens optics or lens elements. The lens holder 322 and/or lens barrel 325 may comprise metal (or may comprise any other suitable material, such as a plastic or polymeric or thermoplastic material or the like). The camera 314 includes a rear housing portion that is mated with the lens holder or front housing portion 322 to encase the imager PCB (having the imager disposed thereat and aligned with the lens) and the connector PCB therein. The rear housing portion includes a connector portion (such as a coaxial connector) for electrically connecting the camera to a wire harness or coaxial connector of the vehicle. The camera 314 includes a lens heater or heating device disposed at the lens barrel 325 and at least partially circumscribing the lens barrel 325, such as described above.

Thus, the heating device comprises a heating element that is disposed at or at least partially around the lens assembly or lens barrel of the exterior vehicle camera, whereby the heating element, when electrically powered, rapidly heats the lens barrel (and lens optics disposed therein). The heating device and electrically connecting pins satisfy the need for lens heating of an exterior camera that is exposed to the outside environment to perform de-icing of the lens and to avoid condensation at the lens, while avoiding difficulties in routing wires within the camera housing. Other heating devices or systems for heating the lens may include a heater or resistive heating element wrapped around the lens barrel, or disposed underneath the top glass of lens assembly, or established as an electrically conductive coating (such as a transparent indium tin oxide (ITO) coating sputter deposited on a surface of the lens optic, such as on the inner or outer surface of the outermost lens optic) to heat the lens surface. Such prior devices and systems require wires at or in the lens barrel to bring in electrical current to generate the heat (via the resistance in the heating element or coating). Wiring into the camera's interior while keeping the camera body sealed is very challenging and quite expensive.

The heating device or circuitry associated with the heating device is at the imager PCB or the connector PCB of the camera and may be directly electrically connected to a vehicle harness or may be connected to or integrated into the camera wiring. The heating device may be electrically connected to the connector PCB via connector pins that do not contact the imager PCB. For example, the pins may pass through a hole through the imager PCB or the pins may pass through a notch established at an edge of the imager PCB to contact the connector PCB on the other side of the imager PCB from the lens of the camera. If the heating device electrically connects to the imager PCB, the heating device may be electrically connected via spring connectors that contact the imager PCB at a perimeter edge or other position of the imager PCB that resists force from the spring connector. The electrical contacts of the heating device may extend radially from the heating device to directly contact the pin or spring in electrical connection with the camera PCB or the electrical contacts may be integrated into the lens holder of the camera and electrically connected to the heating device via wiring embedded in the lens holder. The electrical contact for electrically connecting the pin or spring may be provided by a component that attaches at the lens holder and is in electrical connection with the heating device. Thus, the heating device at the lens barrel electrically connects to a PCB of the camera via a spring or pin without the spring or pin providing force at the imager PCB that could interfere with or affect the focus and/or alignment of the imager at the PCB with the lens.

Activation and control of the heating element may be via signals or inputs to and from the camera to the vehicle's communication network. Control of the heating device may also be provided by way of integrated temperature sensor and timer. For example, a temperature sensor may be included at the camera heating device such that, when the sensed temperature drops below a lower threshold temperature, the heating device is automatically activated to heat the portion of the lens assembly to limit or preclude moisture or ice forming on the lens optics or elements. The heating device may be deactivated when the temperature reaches an upper threshold temperature or after the heating device has been activated for a threshold period of time.

The camera may optionally also include a fluid spraying device that connects to a pressurized fluid supply and has a fluid passageway and nozzle so as to spray fluid onto the lens to clean the lens of dirt or debris. The spraying or cleaning device may operate with or separate from the heating device.

Thus, the camera includes a heating system (and optionally a washer system) that can be disposed at a vehicular camera (such as at and at least partially or entirely around or within a lens barrel of the camera) for heating the lens. The spring-loaded pins or biased pins may utilize aspects of the electrical connectors described in U.S. Pat. Nos. 10,484,587; 10,466,563; 9,878,669 and/or 9,565,342, which are hereby incorporated herein by reference in their entireties. The vehicular camera may utilize aspects of the cameras described in U.S. Publication Nos. US-2019-0113743; US-2018-0207691; US-2016-0272163 and/or US-2016-0264064, and/or U.S. patent application Ser. No. 17/445,006, filed Aug. 13, 2021, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ™ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Publication No. US-2012-0062743, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera for a vehicular vision system, the vehicular camera comprising:
   a camera housing;
   a lens assembly comprising a lens having optic elements;
   wherein the lens assembly is disposed at the camera housing;
   an imager printed circuit board (imager PCB) disposed at the camera housing, wherein the imager PCB has a front side and a rear side separated by a thickness dimension of the imager PCB, and wherein an imager is disposed at the front side of the imager PCB, and wherein the lens is optically aligned with the imager;
   a heating device disposed at at least a portion of the lens assembly, wherein the heating device includes an electrically connecting portion having electrical contacts at an end thereof, wherein the electrical contacts are disposed at an inner surface of the camera housing;

wherein the electrical contacts are spaced from the front side of the imager PCB;

wherein the heating device is electrically connected to circuitry of the vehicular camera via electrical connectors that electrically connect with the electrical contacts of the electrically connecting portion of the heating device at the camera housing as the vehicular camera is assembled;

wherein the camera housing includes a connector portion that is configured to electrically connect the vehicular camera to a wire harness connector of a vehicle when the vehicular camera is disposed at the vehicle to electrically connect the circuitry of the vehicular camera to a power source of the vehicle;

a connector printed circuit board (connector PCB) that is in board-to-board electrical connection with the imager PCB and that is electrically connected to the connector portion of the camera housing, wherein the connector PCB comprises a first side that faces the rear side of the imager PCB and a second side that faces the connector portion of the camera housing;

wherein the electrical connectors (i) extend between the first side of the connector PCB and the electrical contacts of the heating device and (ii) are spaced from and do not contact the imager PCB, and wherein the electrical connectors electrically connect the heating device with circuitry of the connector PCB; and wherein, with the vehicular camera disposed at the vehicle and with the vehicular camera electrically connected to the wire harness connector of the vehicle, the heating device, when electrically operated, heats at least part of the lens that is adjacent to the portion of the lens assembly.

2. The vehicular camera of claim 1, wherein the electrical connectors comprise spring-loaded electrical connectors.

3. The vehicular camera of claim 2, wherein the spring-loaded electrical connectors are disposed at a location adjacent to where the imager PCB attaches at the camera housing, and wherein the electrical contacts of the heating device are disposed at a recessed region of the camera housing so as to be spaced from the imager PCB, and wherein the spring-loaded electrical connectors align with the recessed region and engage the electrical contacts.

4. The vehicular camera of claim 3, wherein the spring-loaded electrical connectors and electrical contacts allow for relative lateral movement during focus and alignment of the lens relative to the imager.

5. The vehicular camera of claim 2, wherein the spring-loaded electrical connectors extend from the connector PCB through a notch at a perimeter edge region of the imager PCB to engage the electrical contacts of the heating device at the camera housing.

6. The vehicular camera of claim 2, wherein the spring-loaded electrical connectors extend from the connector PCB through a hole through the imager PCB to engage the electrical contacts of the heating device at the camera housing.

7. The vehicular camera of claim 1, wherein the camera housing comprises a lens holder, and wherein the lens assembly is attached at the lens holder, and wherein electrical pads are disposed at a carrier element that is attached at an inner surface of the lens holder, and wherein the electrical connectors engage the electrical pads to electrically connect with the electrical contacts of the electrically connecting portion of the heating device at the camera housing as the vehicular camera is assembled.

8. The vehicular camera of claim 7, wherein, with the carrier element attached at the inner surface of the lens holder, the electrical pads electrically connect with the electrical contacts of the electrically connecting portion of the heating device at the camera housing.

9. The vehicular camera of claim 8, wherein the carrier element comprises a plastic element that snap attaches at the camera housing.

10. A vehicular camera for a vehicular vision system, the vehicular camera comprising:

a camera housing;

a lens assembly comprising a lens having optic elements;

wherein the lens assembly is disposed at the camera housing;

an imager printed circuit board (imager PCB) disposed at the camera housing, wherein the imager PCB has a front side and a rear side separated by a thickness dimension of the imager PCB, and wherein an imager is disposed at the front side of the imager PCB, and wherein the lens is optically aligned with the imager;

a heating device disposed at at least a portion of the lens assembly, wherein the heating device includes an electrically connecting portion having electrical contacts at an end thereof, wherein the electrical contacts are disposed at an inner surface of the camera housing;

wherein the electrical contacts are spaced from the front side of the imager PCB;

wherein the heating device is electrically connected to circuitry of the vehicular camera via spring-loaded electrical connectors that electrically connect with the electrical contacts of the electrically connecting portion of the heating device at the camera housing as the vehicular camera is assembled;

wherein electrical pads are disposed at a carrier element that is attached at an inner surface of the camera housing, and wherein, with the carrier element attached at the inner surface of the camera housing, the electrical pads electrically connect with the electrical contacts of the electrically connecting portion of the heating device at the camera housing;

wherein the spring-loaded electrical connectors engage the electrical pads to electrically connect with the electrical contacts of the electrically connecting portion of the heating device at the camera housing as the vehicular camera is assembled;

wherein the spring-loaded electrical connectors are disposed at a location adjacent to where the imager PCB attaches at the camera housing, and wherein the spring-loaded electrical connectors align with the electrical pads and engage the electrical pads;

wherein the camera housing includes a connector portion that is configured to electrically connect the vehicular camera to a wire harness connector of a vehicle when the vehicular camera is disposed at the vehicle to electrically connect the circuitry of the vehicular camera to a power source of the vehicle;

a connector printed circuit board (connector PCB) that is in board-to-board electrical connection with the imager PCB and that is electrically connected to the connector portion of the camera housing, wherein the connector PCB comprises a first side that faces the rear side of the imager PCB and a second side that faces the connector portion of the camera housing;

wherein the spring-loaded electrical connectors (i) extend between the first side of the connector PCB and the electrical pads and (ii) are spaced from and do not contact the imager PCB, and wherein the spring-loaded electrical connectors electrically connect the heating device with circuitry of the connector PCB; and wherein, with the vehicular camera disposed at the vehicle and with the vehicular camera electrically connected to the wire harness connector of the vehicle, the heating device, when electrically operated, heats at least part of the lens that is adjacent to the portion of the lens assembly.

11. The vehicular camera of claim 1, wherein the camera housing comprises a lens holder, and wherein the lens assembly is attached at the lens holder, and wherein the electrical contacts are affixed at an inner surface of the lens holder.

12. The vehicular camera of claim 11, comprising a rear housing portion that is attached at the lens holder to encase the imager PCB and the connector PCB.

13. The vehicular camera of claim 1, comprising an electronic control unit (ECU) comprising electronic circuitry and associated software, wherein the ECU controls operation of the heating device responsive at least in part to temperature at the lens assembly.

14. The vehicular camera of claim 13, wherein, responsive to determination that the temperature at the lens assembly is below a first threshold temperature, the ECU operates the heating device to increase the temperature of the lens assembly of the vehicular camera.

15. The vehicular camera of claim 1, wherein the vehicular camera is configured to be disposed at an exterior portion of the vehicle so as to have a field of view exterior of the vehicle.

16. The vehicular camera of claim 15, wherein, with the vehicular camera disposed at the exterior portion of the vehicle, an outermost optic element of the lens is exposed at the exterior portion of the vehicle.

17. The vehicular camera of claim 1, wherein the heating device comprises an electrically resistive heating element that at least partially circumscribes at least one optic element of the lens assembly.

18. The vehicular camera of claim 1, wherein the heating device comprises a transparent electrically conductive coating disposed at a surface of at least one optic element of the lens.

19. The vehicular camera of claim 10, comprising a rear housing portion that is attached at the camera housing to encase the imager PCB and the connector PCB.

20. The vehicular camera of claim 10, wherein the spring-loaded electrical connectors and electrical pads allow for relative lateral movement during focus and alignment of the lens relative to the imager.

21. The vehicular camera of claim 10, wherein the spring-loaded electrical connectors are electrically connected to circuitry of the connector PCB and extend from the connector PCB to engage the electrical pads through one selected from the group consisting of (i) a notch at a perimeter edge region of the imager PCB and (ii) a hole through the imager PCB.

22. The vehicular camera of claim 10, wherein the carrier element comprises a plastic element that snap attaches at the camera housing.

23. The vehicular camera of claim 10, wherein the vehicular camera is configured to be disposed at an exterior portion of the vehicle so as to have a field of view exterior of the vehicle, and wherein, with the vehicular camera disposed at the exterior portion of the vehicle, an outermost optic element of the lens is exposed at the exterior portion of the vehicle.

24. A vehicular camera for a vehicular vision system, the vehicular camera comprising:

a camera housing;

a lens assembly comprising a lens having optic elements;

wherein the lens assembly is disposed at the camera housing;

an imager printed circuit board (imager PCB) disposed at the camera housing, wherein the imager PCB has a front side and a rear side separated by a thickness dimension of the imager PCB, and wherein an imager is disposed at the front side of the imager PCB, and wherein the lens is optically aligned with the imager;

a heating device disposed at at least a portion of the lens assembly, wherein the heating device includes an electrically connecting portion having electrical contacts at an end thereof, wherein the electrical contacts are disposed at an inner surface of the camera housing at a recessed region of the camera housing so as to be spaced from the imager PCB;

wherein the electrical contacts are spaced from the front side of the imager PCB;

wherein the heating device is electrically connected to circuitry of the vehicular camera via electrical connectors that electrically connect with the electrical contacts of the electrically connecting portion of the heating device at the camera housing as the vehicular camera is assembled;

wherein the electrical connectors are disposed at a location adjacent to where the imager PCB attaches at the camera housing, and wherein the electrical connectors align with the recessed region and engage the electrical contacts;

wherein the electrical connectors and electrical contacts allow for relative lateral movement during focus and alignment of the lens relative to the imager;

wherein the camera housing includes a connector portion that is configured to electrically connect the vehicular camera to a wire harness connector of a vehicle when the vehicular camera is disposed at the vehicle to electrically connect the circuitry of the vehicular camera to a power source of the vehicle;

a connector printed circuit board (connector PCB) that is in board-to-board electrical connection with the imager PCB and that is electrically connected to the connector portion of the camera housing, wherein the connector PCB comprises a first side that faces the rear side of the imager PCB and a second side that faces the connector portion of the camera housing;

wherein the electrical connectors (i) extend between the first side of the connector PCB and the electrical contacts of the heating device and (ii) are spaced from and do not contact the imager PCB, and wherein the electrical connectors electrically connect the heating device with circuitry of the connector PCB;

wherein the vehicular camera is configured to be disposed at an exterior portion of the vehicle so as to have a field of view exterior of the vehicle;

wherein, with the vehicular camera disposed at the exterior portion of the vehicle, an outermost optic element of the lens is exposed at the exterior portion of the vehicle; and wherein, with the vehicular camera disposed at the exterior portion of the vehicle and with the vehicular camera electrically connected to the wire harness connector of the vehicle, the heating device, when electrically operated, heats at least part of the lens that is adjacent to the portion of the lens assembly.

25. The vehicular camera of claim 24, wherein the electrical connectors comprise spring-loaded electrical connectors.

26. The vehicular camera of claim 24, wherein the electrical connectors extend from the connector PCB through a notch at a perimeter edge region of the imager PCB to engage the electrical contacts of the heating device at the camera housing.

27. The vehicular camera of claim 24, wherein the electrical connectors extend from the connector PCB through a hole through the imager PCB to engage the electrical contacts of the heating device at the camera housing.

* * * * *